Oct. 29, 1968   G. T. SHIMABUKURO   3,408,549
MOTOR SYNCHRONIZING SYSTEM UTILIZING REVERSIBLE
COUNTER AND LOGIC MEANS
Filed June 24, 1966

INVENTOR.
GEORGE T. SHIMABUKURO

ATTORNEYS

United States Patent Office 3,408,549
Patented Oct. 29, 1968

3,408,549
MOTOR SYNCHRONIZING SYSTEM UTILIZING REVERSIBLE COUNTER AND LOGIC MEANS
George T. Shimabukuro, Monterey Park, Calif., assignor to Xerox Corporation, Rochester, N.Y., a corporation of New York
Filed June 24, 1966, Ser. No. 560,309
6 Claims. (Cl. 318—85)

This invention relates to improved electric circuits for determining the phase of two signals. More specifically, this invention relates to improved electric circuits for controlling the phase between at least two motors.

Very often it is desirable to operate in synchronism two motors which are spacially removed from each other. This synchronous condition is usually sought because the loads on the shafts of such motors must maintain a precise speed relationship with each other.

In an ideal situation, two identical motors will operate synchronously assuming all the factors which dictate a motor's operation are the same for each motor. However, in the practical situation, identity in design is difficult, if not impossible, to accomplish. Also, environmental factors at the situs of each motor effect that motor's operational characteristics. The differences between individual component characteristics for each motor's control circuits also contribute to altering a particular motor's operation. The variances in component characteristics can exist in new components while also occurring during the aging and use of the component. Various parameters such as line voltage may fluctuate randomly adding to the effect of other factors which alter the operation of the motor from the ideal situation.

In view of all these changing factors, when it is necessary to insure synchronous operation of two motors, a link must be established between the motors in order to provide some indication of when and by what amount one motor is out of synchronism or out of phase with the other motor. However, this indication is not sufficient by itself for the link must also react to this signal of phase difference to provide a compensating effect on one of the motors. The complexity of the link and the physical distance usually between such motors necessitate the requirement that the connecting link be of an electronic nature. Such a link is called a synchronizing circuit. This circuit is generally characterized by two inputs each of which receive a synchronizing or sync signal from a respective motor which represents the condition of phase of the motor. The synchronizing circuit also has an output which provides a compensating signal to the control circuit of one of the motors to correct for an out of phase condition determined by the synchronizing circuit after a comparison of the phase of the sync signals. The sync signal from the motor distant from the sync circuit can be translated to the sync circuit either by direct electrical connection or by electromagnetic radiation. The mode of translation is usually dependent on the distance between the motors as well as the use to which the motors are put.

An exemplary application of two motors which must operate in phase is in a facsimile transmission system. In a typical system there is usually a minimum of two stations, a transmitting or scanner station and a receiving or recorder station. At each station there is a motor which performs a specified task, depending on which station is involved. At the transmitting station, the motor may drive a conventional mechanical scanner which systematically scans an original, for example, a printed document. At the receiver station, a motor drives a mechanical recorder, for example, and a paper conveyor in such a manner to allow the recorder to print a facsimile of the original document on the paper. It is evident from the review of tasks to which the motors at both stations are put that synchronism in the operation of the motors is very desirable. If the motors become out of phase in their operation, the recorded facsimile of the original document at the receiver station will be distorted.

Generally, the operational characteristics of synchronous motors make such motors highly desirable for use in facsimile systems. One characteristic of these motors which lend themselves to use in a facsimile system is their constant speed characteristic regardless of the load. Another important aspect is that the speed at which the motor operates is determined by the frequency of the applied voltage to the motor. This permits a simple and efficient motor speed control scheme by permitting the phase difference between two motors to control the frequency of an astable multivibrator. The output of the multivibrator then provides the applied voltage to the motor. As the motors become out of phase, a synchronizing circuit provides a signal which is indicative of the amount of mis-synchronization between the motors. This signal can be desirably used to make a compensating change in the frequency of the multivibrator controlling the motor. In this manner, a motor's speed may be increased or reduced in order to bring it in phase with another motor. However, as mentioned before, component characteristic changes in the multivibrator, for instance, can effect a mis-synchronization. This obviously is undesirable.

It is an object, therefore, of this invention to improve motor synchronization.

It is another object of this invention to provide improved motor synchronizing circuits whereby changes in parameters of various components have little or no effect on such circuits to control the phase of the motors to be synchronized.

It is another object of this invention to improve motor synchronization wherein any mis-synchronization is corrected in a minimum of time.

It is a further object of this invention to provide improved circuits for accurately determining the relative phase between two signals.

For a better understanding of the invention as well as other objects and features thereof, reference may be made to the following description of the invention to be read in connection with the accompanying drawings wherein.

Figure 1:
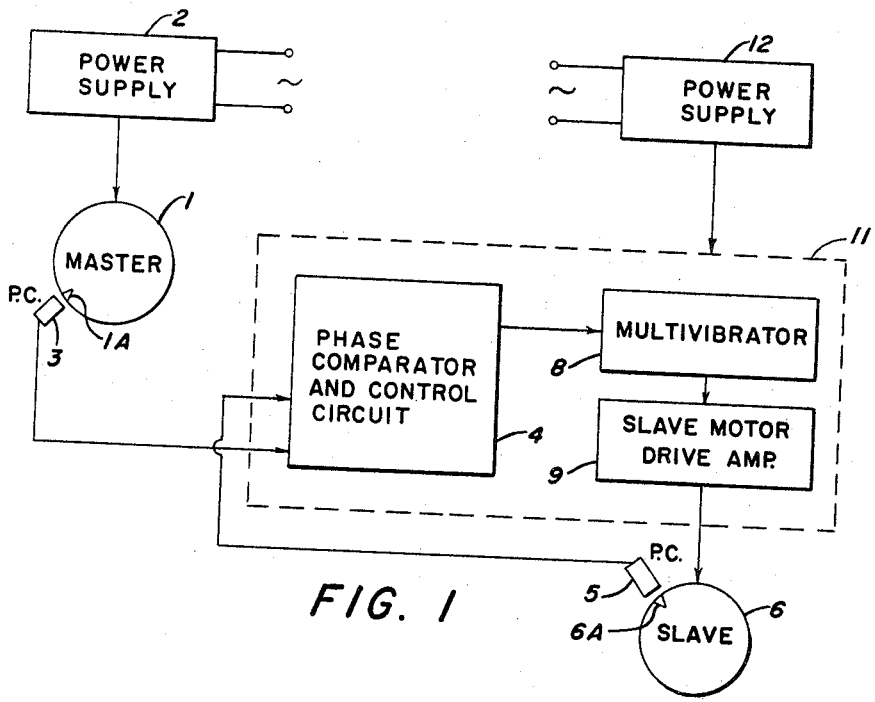
FIGURE 1 is a block diagram showing an overall system in which the present invention may be incorporated.

In FIGURE 1, a system in which the disclosed invention may be used is illustrated. This system includes a motor 1, which will be referred to in this description as the master motor, which is supplied energy from a power source 2. A synchronizing signal referred to as the master sync signal is generated, for example, from a photocell 3 which detects a bench mark 1A suitably located on the master motor. This master sync pulse is supplied to one input of phase comparator and control circuit 4 which also receives a synchronizing signal, referred to as the slave sync signal, from photocell 5 which detects a bench mark 6A located on motor 6, which will hereinafter be referred to as the slave motor. Phase comparator and control circuit 4 compares the phase differences between the master and slave sync signals and accordingly provides an output signal indicative of a desired speed necessary for the slave motor 6 to operate in synchronism with the master motor 1. The effect of the output signal from the phase comparator and control circuit is to effectively change the voltage level at the input terminal of multivibrator 8 which is a conventional astable multivibrator. A variation in this voltage input to this multivibrator 8 effects a corresponding variation in its operating frequency. The output from multivibrator 8 is amplified by conventional slave motor drive amplifier 9 and this amplified output is supplied as power to slave motor 6. It is seen therefore that the relative phase between the two motors controls the frequency of multivibrator 8 at such a value that slave motor 6 will operate in phase with the master motor 1. The circuits of FIG. 1 enclosed in dashed box 11 are symbolically shown to be energized by energy from power supply 12. Phase comparator and control circuit 4 is shown in greater detail in FIGURE 2.

Figure 2:
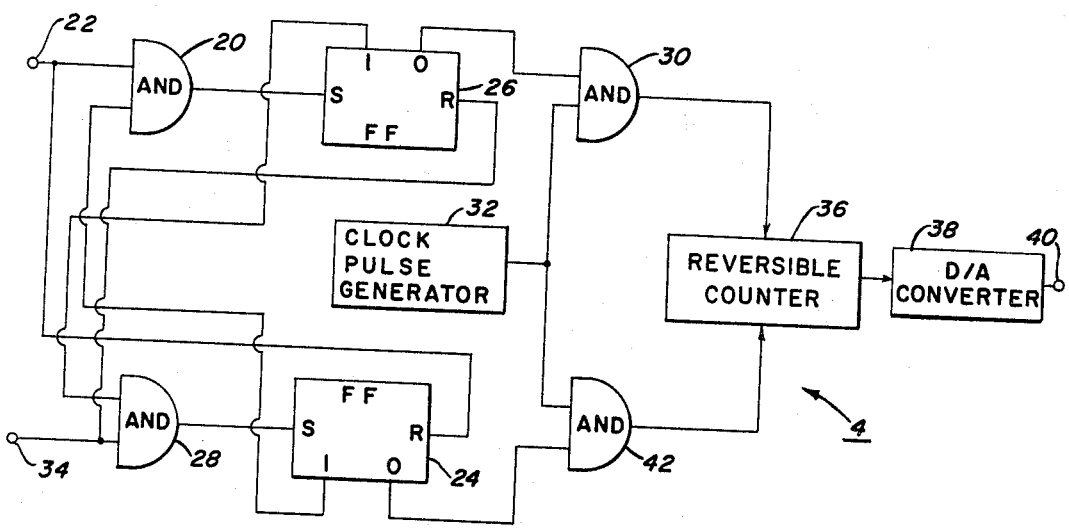
FIGURE 2 is a schematic diagram of the phase comparator and control circuit in accordance with the present invention.

Before reference is made to the operation of the circuit in FIGURE 2, certain terms and other fundamentals should be established. The flip-flops in the circuit of FIGURE 2 are of such a nature as to be set and reset, where applicable, by positive pulses. A positive pulse is defined as a change in potential from one level to a more positive level. Therefore, a negative pulse is correspondingly defined as a change in potential from one level to a more negative level. These flip-flops are considered to be in the reset condition at the beginning of the operation of the circuit and any known reset procedure may be employed. The AND gates in this circuit are of such a nature as to provide a high level output upon the coincidence of two high level inputs. Examples of suitable flip-flop design for utilization in the circuit of FIGURE 2 are shown in Harmon Kardon's publication, "Digital Logic," Catalog No. 515. The AND gates also shown in FIGURE 2 are of conventional design and an example is also set forth in the aforementioned catalog. Although particular reference is made to the catalog design, it is to be understood that any conventional design may be used.

The block diagram of FIGURE 2 illustrates the circuit included in the phase comparator and control circuit 4 referred to hereinabove in regard to FIGURE 1. As noted in the description of FIGURE 1, the phase comparator and control circuit 4 receives two input signals, namely, the master sync and the slave sync signals. In FIGURE 2, the slave sync signal is applied to one input of AND gate 20 by way of terminal 22 as well as to the reset input of a flip-flop 24. The other input of AND gate 20 is directly connected to the one or set output of the flip-flop 24. Since flip-flop 24 is initially in its reset condition, the input of AND gate 20 connected to this flip-flop's one output is enabled thereby permitting a received slave sync signal to pass through this gate 20 to set a flip-flop 26. Once flip-flop 26 is set, the input of an AND gate 28 directly connected to the one output of this flip-flop 26 is disabled. Simultaneously with the disabling of this input to the AND gate 28, an enabling signal is present at the zero output of flip-flop 26 which enables one input of the AND gate 30 to which it is connected. The other input to AND gate 30 is connected to the output of a conventional clock pulse generator 32. During its enabled state, the AND gate 30 passes a predetermined number of clock pulses from generator 32 to one input of a conventional reversible counter 36. The number of pulses passed by gate 30 is determined by the duration of the enabling signal from the flip-flop 26 and the pulse repetition frequency of the clock pulse generator 32.

This enabling signal is terminated upon the receipt of a master sync signal at terminal 34 by the phase comparator and control circuit 4. Since the other input to the AND gate 28 is disabled by the set condition of the flip-flop 26, the master sync signal is not passed by the AND gate 28. However, this master sync signal does reset the flip-flop 26 thereby terminating the enabling signal to the AND gate 30. Upon termination of this enabling signal, clock pulses are no longer passed by this AND gate 30 and a synchronizing cycle is completed.

From the description hereinabove of the cooperation between the AND gates 20 and 28, and flip-flops 24 and 26, the period during which the flip-flop 26 is in its set condition corresponds in time substantially to the period of time between arrival of the slave and master sync signals at input terminals 22 and 34, respectively.

Those pulses which were passed by the AND gate 30 during the set condition of the flip-flop 26 enter a count in one direction, referred to as a reverse direction, in the reversible counter 36. This count is a function of the pulse repetition frequency of the clock generator 32 and the duration of the set condition of the flip-flop 26. In response to a particular count registered in the counter 36, a digital-to-analog (D/A) converter 38, also of conventional design, reacts to the particular count condition in the counter 36 and converts it to an analog signal representative thereof at its output terminal 40.

As noted in the description of FIGURE 1 this voltage signal at terminal 40 acts to provide a compensating voltage to control the operating frequency of the multivibrator 8, thereby controlling the speed of the slave motor 6.

In the particular situation described hereinabove, the slave sync signal is leading the master sync signal and the count in the counter 36 will effect a compensating voltage to control the oeprating frequency of the multivibrator at the input of multivibrator 8 to effectively decrease the speed of the slave motor 6 so that it will be operating in synchronism with the master motor 1.

The situation in which the master sync signal leads the slave sync signal is similar to the aforedescribed operation of the circuit of FIGURE 2. However, the flip-flop 24 is set upon receipt of the master sync signal and remains in this condition until reset by the slave sync signal. During the set condition of this flip-flop 24, the AND gate 42 is enabled to pass an appropriate number of clock pulses from the clock pulse generator 32. These clock pulses which are passed by AND gate 42 to the other input of the counter 36 serve to enter a count in the reversible counter 36 in a direction opposite to that of the count entered when the AND gate 30 was enabled or in a forward direction. In this manner the digital-to-analog converter 38 will generate a voltage to effect an increase in the speed of the slave motor 6 to bring it into synchronism with the master motor 1.

In the situation wherein the master and slave motors are operating in synchronism, the master and slave sync signals will act to set both flip-flops 24 and 26 while substantially simultaneously reset these same flip-flops. Preferably, the flip-flops will remain in their initial reset condition. If propagation delays in the AND gates 20 and 28 are such to prevent this, suitable delays may be used to insure this preferred result thereby rendering the condition in the counter 36 unchanged.

Each count of which the reversible counter 36 is capable is representative, in effect, of a different slave motor speed. Once this count is entered in the counter 36, the speed of the slave motor 6, through the D/A converter 38 and the astable multivibrator 8, will be adjusted to reflect the particular count. If the speed of the slave motor is too slow or too fast relative to the master motor speed, the phase comparator and control circuit 4 will detect this difference and effect an appropriate change in the slave motor speed by causing the appropriate count to be entered in the reversible counter 36.

Since each count in the counter 36 is representative of a different slave motor speed, the accuracy of the synchronizing system may be adjusted by varying the pulse repetition frequency of the clock pulse generator 32. With a higher frequency, greater accuracy may be obtained since more incrementally different slave motor speeds are available.

It will be realized by the person skilled in the art that the capacity of the reversible counter may have to be increased or decreased depending upon the pulse repetition frequency of the clock generator and the maximum possible phase difference between the master and slave syncs.

While a reversible counter is described in the preferred embodiment of the present invention, two conventional uni-directional counters may also be utilized to effect complementary count conditions in response to the pulses passed by the gates 30 and 42. In this situation, each counter may be individually coupled to the digital-to-analog converter in such a manner to present the converter with a signal representative of the net count of the counters.

The digital-to-analog converter 38 may, for example, include a series of parallel resistor-diode branches, each one of which monitors a particular stage of the reversible counter 36. The resistor in each parallel branch may be weighted to reflect the particular count of the counter. For example, a high count will activate the diode associated with a high value resistor while a lower count will be associated with a proportionally lower value resistor.

The monitoring of the various stages of the counter by the D/A converter 38 may be continuous. In such a case, an integrating circuit may be utilized to provide an average value for a series of consecutive counts in the counter 36 or an average value of analog signals from the D/A converter 38.

The person skilled in the art will acknowledge also the use of gates, such as AND gates, at the outputs of the counter to enable discreet monitoring of this counter only at such a time when a count representative of a particular phase condition is registered in the counter. These gates may have their other input commonly connected through an OR gate, for example, which would monitor the resetting of either flip-flop 24 or 26 indicating the completion of a phase difference determination.

While the invention has been described with reference to the circuit disclosed herein, it is not confined to the details set forth since it is apparent that electrical equivalent components may be substituted for the components of the preferred circuit without deparing from the scope of the invention. Thus, for example, the flip-flops and gates may be replaced with other combinations of components to perform the same function as obtained in the circuit shown in FIGURE 2.

Although reference has been made earlier to the use of a synchronous motor, it is obvious that the present synchronizing circuit could be easily adapted to any motor whose speed is dependent upon the frequency of the applied power to the motor.

It should also be understood that, although the phase comparator and control circuit of FIGURE 2 is described in a motor synchronizing system, it is apparent to those skilled in the art that this phase comparator and control circuit has useful application in other systems.

Therefore, it is intended that such modifications or changes be covered as may come within the scope of the invention as defined by the following claims.

What is claimed is:

1. In a system for operating a synchronous AC slave motor in substantial synchronism with an AC master motor, the combination comprising:
   (a) means for generating a pattern of periodic master synchronizing pulses indicative of the rotational position and speed of said master motor;
   (b) means for generating a pattern of periodic slave synchronizing signals indicative of the rotational position and speed of said slave motor;
   (c) means including a source of variable frequency AC power for selectively controlling the speed of said slave motor;
   (d) digital-to-analog converter means coupled to said variable AC power source for selectively developing frequency determining signals for controlling the frequency of said variable AC power source;
   (e) reversible counter means having two inputs for causing said counter means to enter a count in either a forward or a reverse direction in response to count signals at one or the other of said inputs, respectively;
   (f) circuit means for coupling a signal representative of the count in said reversible counter means to said digital-to-analog converter means; and,
   (g) control means responsive to said master and slave synchronizing pulses for generating at either said one or said other of said inputs of said reversible counter means, depending upon the sense of phase difference between said master and said slave motors, count signals indicative of the phase difference between said master and slave motors.

2. The combination as defined in claim 1 wherein said control means includes:
   (a) phase comparator means for generating a leading phase signal or a lagging phase signal, the duration of said leading or lagging phase signals being a function of the phase difference between said master and slave motors;
   (b) pulse means for generating a plurality of like pulses at a predetermined pulse repetition frequency;
   (c) first AND gating means responsive to said leading phase signal and said like pulses for generating count signals at said one of said inputs of said reversible counter means indicative of coincidence being said leading phase signal and said like pulses; and,
   (d) second AND gating means responsive to said lagging phase signal and said like pulses for generating count signals at said other of said inputs of said reversible counter means indicative of coincidence being said lagging phase signal and said like pulses.

3. A control circuit for generating a signal, the amplitude of which is indicative of the phase difference between first and second signals, comprising:
   (a) first and second input terminals adapted to receive said first and second signals;
   (b) phase comparator means coupled to said input terminals and having two output terminals for generating a phase signal indicative of the phase difference between said first and second signals at either of said output terminals depending on which of said first and second signals is received first at said first and second input terminals, respectively;
   (c) pulse generator means for generating periodic pulses having a predetermined pulse repetition frequency;
   (d) first logic means having at least two inputs individually coupled to one of said output terminals and said pulse generator means, respectively, for generating count signals indicative of the coincidence of said periodic pulses and said phase signal at said one of said output terminals;
   (e) second logic means having at least two inputs individually coupled to the other of said output terminals and said pulse generator means, respectively, for generating count signals indicative of the coincidence of said periodic pulses and said phase signal at said other of said output terminals:
   (f) counting means having a plurality of predetermined cyclic sequential count conditions coupled to said first and second logic means and responsive to said count signals for effecting one of said plurality of predetermined count conditions as a function of said count signals to which said counting means is responsive; and,
   (g) monitor means coupled to said counting means for generating a signal, the amplitude of which is indicative of the condition effected by said counting means.

4. A control circuit for generating a signal, the amplitude of which is indicative of the phase difference between first and second signals, comprising:
   (a) comparator means for generating a leading phase signal or a lagging phase signal at one or the other of two output terminals depending on the time sequence of said first and second signal, the duration of said leading or lagging phase signal being a function of the phase difference between said first and second signal;

(b) pulse means for generating a plurality of like pulses at a predetermined pulse repetition frequency;

(c) first gating means responsive to said leading phase signal and said pulses for generating a first count signal indicative of the coincidence of said leading phase signal and said like pulses;

(d) second gating means responsive to said lagging phase signal and said pulses for generating a second count signal indicative of the coincidence of said lagging phase signal and said like pulses;

(e) counter means having a plurality of predetermined cyclic sequential count conditions and responsive to said first and second count signals for effecting one of said predetermined count conditions representative to said first or said second count signals; and, (f) converter means responsive to said one of said predetermined count conditions for generating an output signal, the amplitude of which is indicative of said one of said predetermined count conditions.

5. The control circuit recited in claim 4 wherein:
(a) said counter means includes a reversible counter,
(b) said first count signal effects a change in the count condition in said counter in one direction and said second count signal effects a change in the count condition of said counter in a direction opposite to said one direction; and,
(c) wherein said converter means includes a digital-to-analog converter.

6. A control circuit for generating a signal, the amplitude of which is indicative of the phase difference between first and second signals, comprising:

(a) comparator means for generating a leading signal at a first terminal, the duration of which is a function of the time interval by which said first signal leads said second signal, and for generating a lagging signal at a second terminal, the duration of which is a function of the time interval by which said first signal lags said second signal;

(b) means for generating a plurality of like pulses having a predetermined pulse repetition frequency;

(c) counter means having two inputs and a plurality of predetermined cyclic sequential count conditions and responsive to count signals at one or the other of said inputs for entering a count in either a forward or a reverse direction, respectively;

(d) first logic gating means for generating at one of said inputs of said counter means count signals representative of the coincidence of said leading signal and said like pulses;

(e) second logic gating means for generating at the other of said inputs of said counter means count signals representative of the coincidence of said lagging signal and said like pulses;

(f) converter means coupled to said counter means for generating an output signal, the amplitude of which is a function of the count of said counter means.

References Cited

UNITED STATES PATENTS

| | | | |
|---|---|---|---|
| 2,881,377 | 4/1959 | Apa et al. | 318—314 X |
| 3,110,853 | 11/1963 | Jones | 318—318 X |
| 3,237,178 | 2/1966 | Valentine | 318—31 X |

ORIS L. RADER, *Primary Examiner.*

B. A. COOPER, *Assistant Examiner.*